US012591551B2

(12) United States Patent
Tatsuno

(10) Patent No.: US 12,591,551 B2
(45) Date of Patent: Mar. 31, 2026

(54) GENERATION METHOD, SEARCH METHOD, AND GENERATION DEVICE

(71) Applicant: Kioxia Corporation, Tokyo (JP)

(72) Inventor: Kento Tatsuno, Kawasaki (JP)

(73) Assignee: Kioxia Corporation, Tokyo (JP)

( * ) Notice: Subject to any disclaimer, the term of this patent is extended or adjusted under 35 U.S.C. 154(b) by 69 days.

(21) Appl. No.: 18/244,134

(22) Filed: Sep. 8, 2023

(65) Prior Publication Data

US 2024/0211447 A1 Jun. 27, 2024

(30) Foreign Application Priority Data

Dec. 27, 2022 (JP) ................................. 2022-210037

(51) Int. Cl.
*G06F 16/18* (2019.01)
*G06F 16/14* (2019.01)
*G06N 5/01* (2023.01)

(52) U.S. Cl.
CPC ........ *G06F 16/1847* (2019.01); *G06F 16/148* (2019.01); *G06N 5/01* (2023.01)

(58) Field of Classification Search
CPC ...... G06F 16/1847; G06F 16/148; G06N 5/01
See application file for complete search history.

(56) References Cited

U.S. PATENT DOCUMENTS 12,189,631 B2 * 1/2025 Cella ..................... G06F 16/182
2004/0139067 A1 * 7/2004 Houle ..................... G06F 16/93

2004/0162834 A1 * 8/2004 Aono .................. G06F 16/3344
707/E17.08
2017/0161271 A1 * 6/2017 Barel .................... G06F 16/903
2021/0248181 A1 * 8/2021 Zhang .................. G06F 18/251
2021/0406312 A1 * 12/2021 Iwasaki ............... G06F 16/9024
(Continued)

FOREIGN PATENT DOCUMENTS

JP 5436346 B2 3/2014
JP 2014-074959 A 4/2014
JP 2021-131783 A 9/2021

OTHER PUBLICATIONS

Malkov et al. "Efficient and robust approximate nearest neighbor search using Hierarchical Navigable Small World graphs", 2018 (Year: 2018).*

(Continued)

*Primary Examiner* — Matthew J Ellis
(74) *Attorney, Agent, or Firm* — Maier & Maier, PLLC

(57) ABSTRACT

According to an embodiment, a generation method includes: setting one of multiple first nodes as a second node; selecting (M−1) (M is an integer of two or more) fourth nodes from among one or more third nodes on the basis of a directed graph; and writing, to a first storage area, an information piece related to each of the second node and the (M−1) fourth nodes. The multiple first nodes are included in the directed graph and correspond to vectors in a search range. Each of the one or more third nodes is an out-neighbor node of the second node in the multiple first nodes. The information piece is an element related to one first node of the index information corresponding to the directed graph. The information piece includes a vector value of the one first node and IDs of all out-neighbor nodes of the one first node.

19 Claims, 13 Drawing Sheets

(56) References Cited

U.S. PATENT DOCUMENTS

2022/0342934 A1\* 10/2022 Guan ................. G06F 16/9024
2023/0334093 A1\* 10/2023 Garduno Hernandez ...................
　　　　　　　　　　　　　　　　　　G06F 16/9024

OTHER PUBLICATIONS

Malkov et al. "Efficient and Robust Approximate Nearest Neighbor Searching Using Hierarchical Navigable Small World Graphs", 2018, IEEE transactions on pattern analysis and machine intelligence (Year: 2018).\*

Sharma, "What Happens when RPA and Blockchain Work Together?", Blockchain Council, Jun. 12, 2020, URL: https://www.blockchain-council.org/blockchain/what-happens-when-rpa-and-blockchain-work-together/ (Year: 2020).\*

Li, et al. "Approximate Nearest Neighbor Search on High Dimensional Data—Experiments, Analyses, and Improvement (v1.0)." IEEE Transactions on Knowledge and Data Engineering 32.8 (2019): 1475-1488.

Suhas Jayaram Subramanya et al. "DiskANN: Fast Accurate Billionpoint Nearest Neighbor Search on a Single Node".

Shengwen Liang et al. "Cognitive SSD: A Deep Learning Engine for In-Storage Data Retrieval".

\* cited by examiner

FIG.7

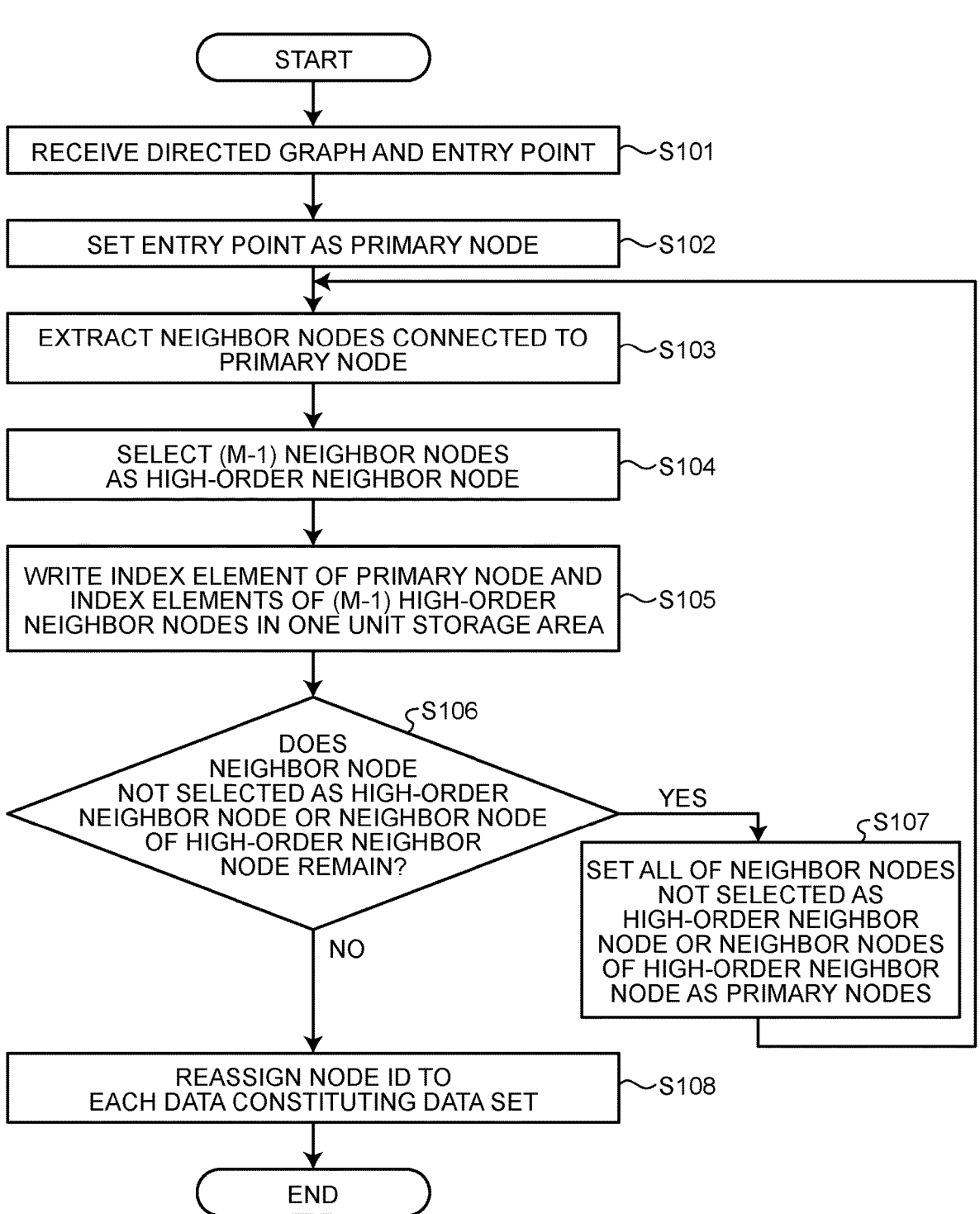

START

RECEIVE DIRECTED GRAPH AND ENTRY POINT ~S101

SET ENTRY POINT AS PRIMARY NODE ~S102

EXTRACT NEIGHBOR NODES CONNECTED TO PRIMARY NODE ~S103

SELECT (M-1) NEIGHBOR NODES AS HIGH-ORDER NEIGHBOR NODE ~S104

WRITE INDEX ELEMENT OF PRIMARY NODE AND INDEX ELEMENTS OF (M-1) HIGH-ORDER NEIGHBOR NODES IN ONE UNIT STORAGE AREA ~S105

S106
DOES NEIGHBOR NODE NOT SELECTED AS HIGH-ORDER NEIGHBOR NODE OR NEIGHBOR NODE OF HIGH-ORDER NEIGHBOR NODE REMAIN?

YES

S107
SET ALL OF NEIGHBOR NODES NOT SELECTED AS HIGH-ORDER NEIGHBOR NODE OR NEIGHBOR NODES OF HIGH-ORDER NEIGHBOR NODE AS PRIMARY NODES

NO

REASSIGN NODE ID TO EACH DATA CONSTITUTING DATA SET ~S108

END

●···NODE SET AS PRIMARY NODE NDp

◍···NODE SELECTED AS HIGH-ORDER NEIGHBOR NODE NBRh

●···NODE SET AS PRIMARY NODE NDp

◍···NODE SELECTED AS HIGH-ORDER NEIGHBOR NODE NBRh

GENERATION METHOD, SEARCH METHOD, AND GENERATION DEVICE

CROSS-REFERENCE TO RELATED APPLICATIONS

This application is based upon and claims the benefit of priority from Japanese Patent Application No. 2022-210037, filed on Dec. 27, 2022, the entire contents of which are incorporated herein by reference.

FIELD

Embodiments described herein relate generally to a generation method, a search method, and a generation device.

BACKGROUND

As one of graph-based approximate nearest neighbor search algorithms, an algorithm called DiskANN has been known. According to the DiskANN, a directed graph is created by treating, as a node, each multidimensional vector in a multidimensional vector group that is a search range, and index information generated on the basis of a structure of the directed graph is stored in a storage device. Then, a search operation along the directed graph is performed on the basis of the index information in the storage device.

BRIEF DESCRIPTION OF THE DRAWINGS

FIG. 7 is a flowchart illustrating an example of an operation of the generation device according to the embodiment;

DETAILED DESCRIPTION

According to the present embodiment, a generation method includes setting one of multiple first nodes as a second node. The multiple first nodes are included in a directed graph. The multiple first nodes correspond to vectors included in a search range. The generation method includes selecting (M−1) fourth nodes (M is an integer of two or more) from among one or more third nodes on the basis of the directed graph. Each of the third nodes is an out-neighbor node of the second node in the multiple first nodes. The generation method includes writing, to a first storage area, an information piece related to the second node and the (M−1) fourth nodes. The information piece is an element related to one first node in index information corresponding to the directed graph. The information piece includes a vector value of the one first node and IDs of all out-neighbor nodes of the one first node. The first storage area is one of second storage areas. The second storage area is a unit of access to a storage device.

A generation method, a search method, and a generation device according to embodiments will be described in detail with reference to the accompanying drawings.

Note that the present invention is not limited by the present embodiment.

Embodiment

Figure 1:
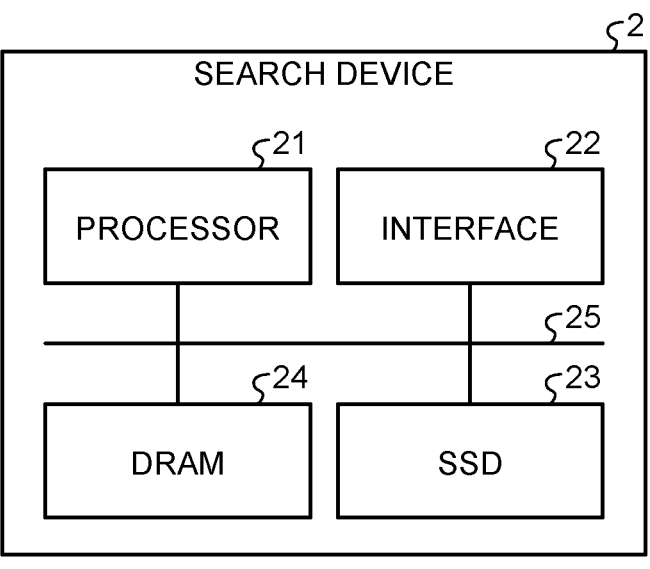
FIG. 1 is a schematic diagram illustrating an example of a configuration of a search device according to an embodiment.

First, an example of a device (referred to as a search device) on which a search method of an embodiment is executed will be described. FIG. 1 is a schematic diagram illustrating an example of a configuration of a search device according to the embodiment.

In the example illustrated in FIG. 1, a search device 2 includes a processor 21, an interface 22, a solid state drive (SSD) 23, a dynamic random access memory (DRAM) 24, and a bus 25. The processor 21, the interface 22, the SSD 23, and the DRAM 24 are electrically connected to the bus 25.

The interface 22 is a device that inputs and outputs information to and from the search device 2. The interface 22 includes an interface for communication via a network, an interface to which a storage device can be connected, an interface to which an input device such as a keyboard can be connected, and the like. The search device 2 can receive an input of a query via the interface.

The SSD 23 is a relatively large-capacity nonvolatile memory that functions as a storage device in the search device 2. Note that the storage device applicable to the search device 2 is not limited to the SSD. The search device 2 may include a magnetic disk device as the storage device.

The DRAM 24 is a memory whose access operation is faster than that of the storage device. The DRAM 24 functions as a cache area, a buffer area, a work area, or the like. Note that the memory that is faster in access operation than the storage device applicable to the search device 2 is not limited to the DRAM.

The processor 21 is a computation device that is capable of executing a computer program, and implements a function defined by the computer program. The processor 21 is, for example, a central processing unit (CPU). In the search device 2, the processor 21 executes a search operation according to the DiskANN on the basis of a search program (a search program SPG to be described later). The search program SPG is stored in, for example, the SSD 23 or a device outside the search device 2. The processor 21 loads the search program SPG from the SSD 23 or a device external to the search device 2 into the DRAM 24 under the environment provided by the operating system. The processor 21 then executes the search program SPG loaded in the DRAM 24.

Note that the processor 21 may not be a CPU. Some of or all the search operation according to the DiskANN (for example, an operation illustrated in FIG. 11 to be described later) may be implemented by a hardware circuit such as a field-programmable gate array (FPGA) or an application specific integrated circuit (ASIC).

Figure 2:
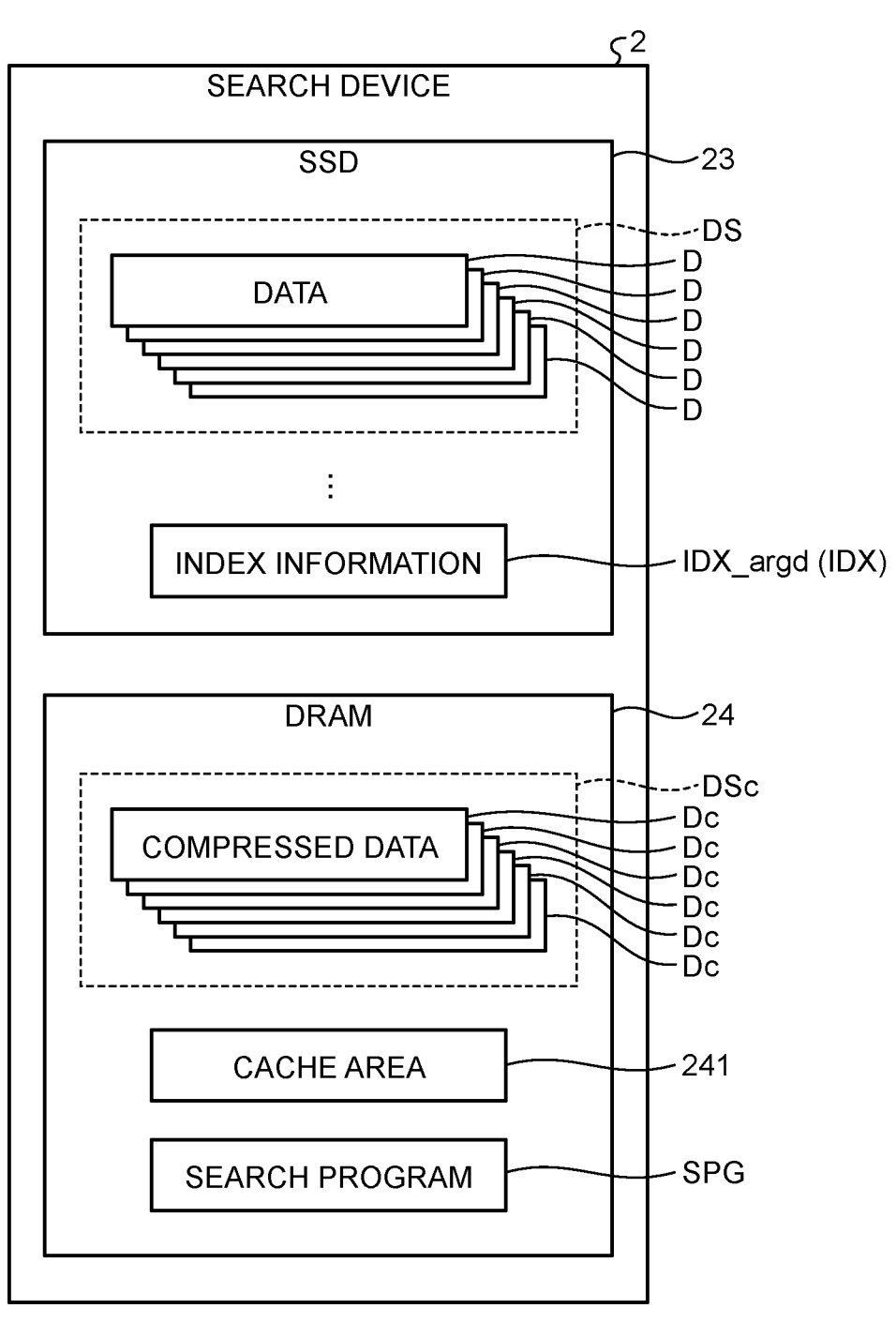
FIG. 2 is a schematic diagram for explaining an example of information stored in an SSD and a DRAM when the search device according to the embodiment performs a search.

FIG. 2 is a schematic diagram for explaining an example of information stored in the SSD 23 and the DRAM 24 when the search device 2 according to the embodiment performs a search.

The SSD 23 stores a group of data D which is a data set DS as a search range. Each piece of data D includes N elements (where N is an integer of one or more). In other words, each piece of data D is an N-dimensional vector. Each piece of data D is an image, a document, or any other type of data, or data generated from these data. In one example, data D includes N feature amounts extracted from the image. The number of elements N is the same to all the data D and a query to be described later.

Prior to the search operation, a directed graph that each data D in the data set DS is treated as a node is generated, and the index information IDX corresponding to the directed graph is generated. Then, the index information IDX is stored in the storage device (the SSD 23 in the example illustrated in FIG. 2).

The DRAM 24 stores a group of compressed data Dc generated by compressing each data D in the data set DS. A group of the compressed data Dc is referred to as a compressed data set DSc.

A cache area 241 in which at least a part of the index information IDX can be stored as cache data is allocated to the DRAM 24.

Moreover, a search program SPG is loaded into the DRAM 24. The processor 21 executes a search operation in accordance with the search program SPG loaded in the DRAM 24.

In the search operation, the processor 21 searches for data D (in other words, a node) in the data set DS, whose distance to a query input from the outside is the closest.

In the present specification, the distance is a measure representing similarity between pieces of data. Mathematically, the distance is, for example, a Euclidean distance. Note that the mathematical definition of the distance is not limited to the Euclidean distance. Moreover, the index used for the evaluation of the distance is not limited to the Euclidean distance or the like, and an optional index can be used as long as it corresponds to the distance.

Moreover, in the search operation, the processor 21 performs a search along a path defined by a directed graph generated from the data set DS.

Figure 3:
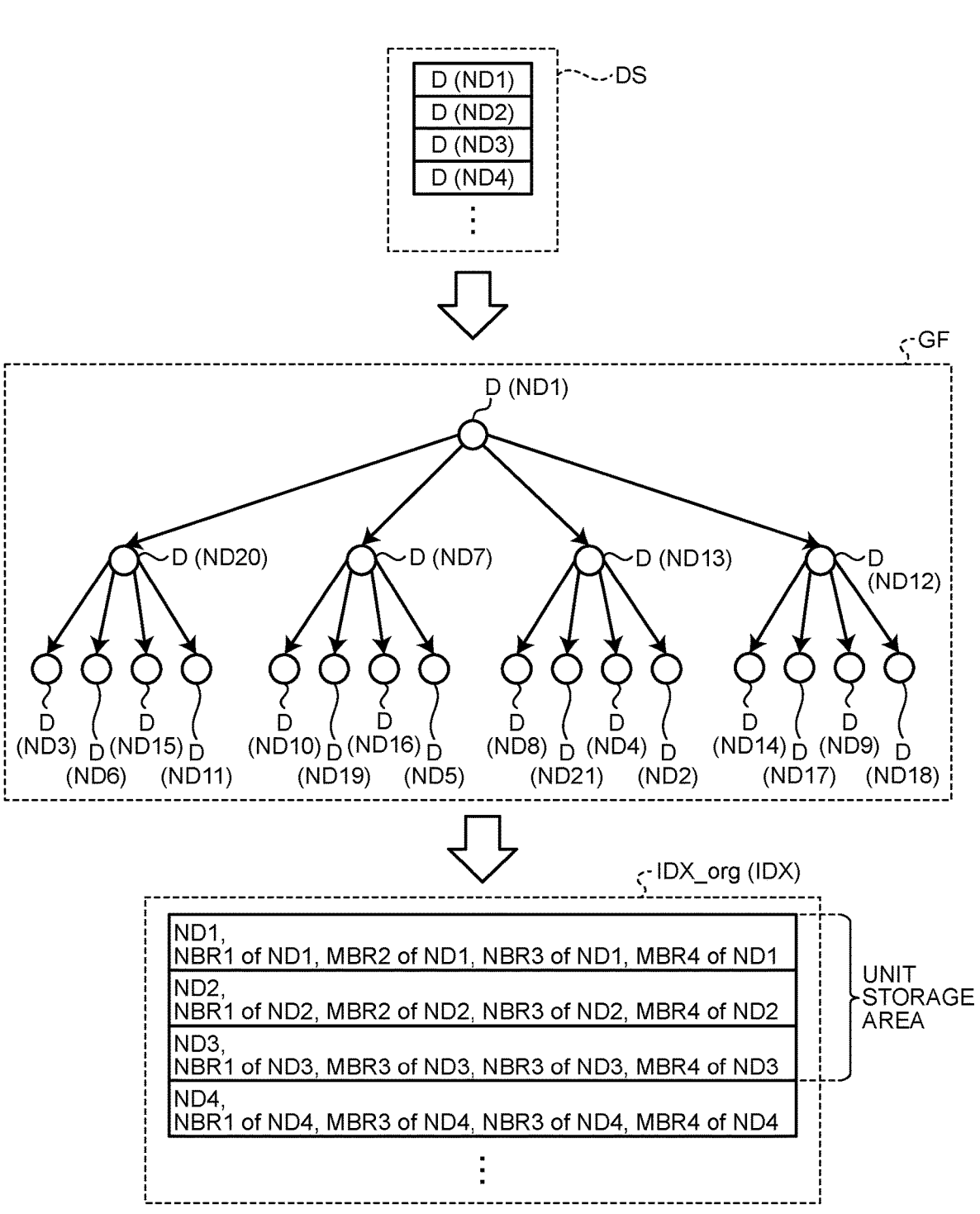
FIG. 3 is a diagram for explaining an example of a directed graph generated from a data set of the embodiment.

FIG. 3 is a diagram for explaining an example of a directed graph GF generated from the data set DS according to the embodiment.

A node ID is assigned to each data D included in the data set DS. The node ID is an example of identification information capable of identifying a node. A method of assigning the node ID to each data D is not limited to a specific method. Hereinafter, the data D to which X as the node ID (where X is numerical information) is assigned may be referred to as a node NDX. Additionally, the data D may be referred to as a node.

In the middle part of FIG. 3, a directed graph GF generated from the data set DS is illustrated. In this example, an edge whose head is the node ND20, an edge whose head is the node ND7, an edge whose head is the node ND13, and an edge whose head is the node ND12 are connected to the node ND1. An edge whose head is the node ND3, an edge whose head is the node ND6, an edge whose head is the node ND15, and an edge whose head is the node ND11 are connected to the node ND20. An edge whose head is the node ND10, an edge whose head is the node ND19, an edge whose head is the node ND16, and an edge whose head is the node ND5 are connected to the node ND7. An edge whose head is the node ND8 an edge whose head is the node ND21, an edge whose head is the node ND4, and an edge whose head is the node ND2 are connected to the node ND13. An edge whose head is the node ND14, an edge whose head is the node ND17, an edge whose head is the node ND9, and an edge whose head is the node ND18 are connected to the node ND12.

In this specification, in a case where the node NDA and the node NDB are connected by an edge whose head is the node NDB, the node NDA is referred to as an in-neighbor node (in-neighbor) of the node NDB. The node NDB is referred to as an out-neighbor node of the node NDA or referred to as a neighbor node NBR. The number of in-neighbor nodes of the node NDB is expressed by an in-degree. The number of out-neighbor nodes of the node NDA is expressed by an out-degree.

Note that, in the example illustrated in FIG. 3, the directed graph GF has a tree structure. The shape of the directed graph GF is not limited to a tree structure. The nodes may not have the same in-degree or out-degree. The nodes may be connected to form a circular shape.

In the search operation, the processor 21 performs an operation of searching for a node closest to the query along the directed graph GF on the basis of an optional search algorithm. As a calculation algorithm for the search, an optional one of including Greedy search, Beam search, and so forth can be adopted. Briefly describing an example, the processor 21 sequentially switches a search target node among the nodes along the graph GF. Each time the search target node is switched, the processor 21 calculates a distance between each neighbor node NBR of the search target node and the query. Then, the processor 21 sets, as a new search target node, a node closest to the query among one or more neighbor nodes NBRs of one or more search target nodes currently close to the query. The processor 21 sequentially switches the search target node along the directed graph GF until reaching the data D estimated to be closest to the query. The processing of switching the search target node along the graph GF may be referred to as a "hop operation".

The processor 21 makes reference to the index information IDX corresponding to the directed graph GF in order to specify each neighbor node NBR of the search target node. That is, the index information IDX has a data structure capable of deriving the structure of the directed graph GF.

When making reference to the index information IDX under the control according to the search program SPG, the processor 21 issues an IO request for reading from the SSD 23 to the operating system. Specifically, the storage area of the SSD 23 viewed from the processor 21 under the control according to the search program SPG is subdivided into unit storage areas each having the same size. The IO request is a request for accessing (reading from or writing to) a desired one of the unit storage areas. The unit storage area can be considered as a unit of access to the SSD 23. The unit storage area may be a page, a cluster, a sector, or the like, or may be different from any of these. The processor 21 can acquire information stored in a target unit storage area of the index information IDX by one IO request.

Hereinafter, for simplifying the description, the processor 21 as a subject of operation under the control of the search program SPG is referred to as a search program SPG.

In FIG. 3, index information IDX_org is illustrated as an example of the index information IDX. The index information IDX_org has a data structure that index elements are arranged in order of node ID. Each index element is information including a vector value of one node and node IDs of all neighbor nodes NBRs of the one node. Each index element is an information piece of the index information IDX_org.

Moreover, in this example, the size of the index element is ⅓ of the size of the unit storage area. Therefore, in response to one IO request, three index elements stored in the same unit storage area are collectively read from the SSD 23.

The search program SPG collectively acquires index elements (three index elements in the example of FIG. 3) including an index element of the search target node from the unit storage area in which the index element of a search target node is stored by the IO request. In this case, the search program SPG stores, in the cache area 241, all the index elements of the index elements acquired at once. Then, when the search target node is switched by the hop operation, in a case where the index element of the switched search target node exists in the cache area 241, the search program SPG acquires the index element not from the SSD 23 but from the cache area 241.

However, according to the index information IDX_org illustrated in FIG. 3, index elements are arranged in the order of the node ID, and the order of those index elements is scarcely related to the connection between the nodes in the directed graph GF. In other words, in a case where index elements are acquired from the SSD 23 by the IO request, those index elements scarcely have a relation to the connection between the nodes in the directed graph GF. Therefore, even if an index element other than the index element of a given search target node is stored in the cache area 241, there is a significantly low possibility that the index element of the search target node after the switching is a cache hit after the switching of the search target node. The possibility of a cache hit is remarkably low, so that a read to the SSD 23 whose operation speed is slower than that of the cache area 241 (that is, the DRAM 24) occurs for each hop operation. As a result, it takes a long time from the input of the query to the completion of the search operation.

According to the embodiment, the index information IDX_argd is generated such that index elements with high relevancy in terms of a connection in the directed graph GF is written in the same unit storage area so as to enhance the cache hit rate. The index information IDX_argd is stored in the SSD 23 of the search device 2, and the search program SPG executes the search operation on the basis of the index information IDX_argd in the SSD 23.

Next, a device (referred to as a generation device 1) that implements a method of generating the index information IDX_argd will be described.

Figure 4:
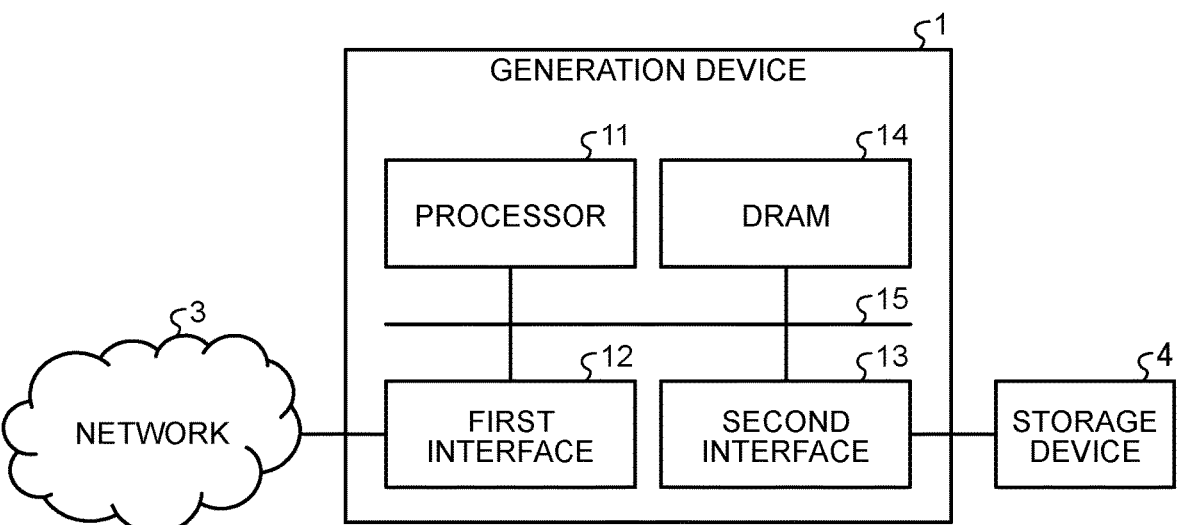
FIG. 4 is a schematic diagram illustrating an example of a configuration of a generation device according to the embodiment.

FIG. 4 is a schematic diagram illustrating an example of a configuration of the generation device 1 according to the embodiment.

The generation device 1 includes a processor 11, a first interface 12, a second interface 13, a DRAM 14, and a bus 15. The first interface 12, the processor 11, the DRAM 14, and the second interface 13 are electrically connected to the bus 15.

The first interface 12 is a circuit that receives data from a device outside the generation device 1. In this example, the first interface 12 is a device for performing communication with an external device via a network 3. The first interface 12 is, for example, an Ethernet (trademark) adapter, a Wi-Fi (trademark) adapter, or the like.

The second interface 13 is a circuit that outputs data to an external device. In this example, the second interface 13 is an adapter for connecting to a storage device 4. The type of the storage device 4 is not limited to a specific type. The storage device 4 may be, for example, an SSD, a hard disk drive (HDD), a universal flash storage (UFS), or the like.

Figure 5:
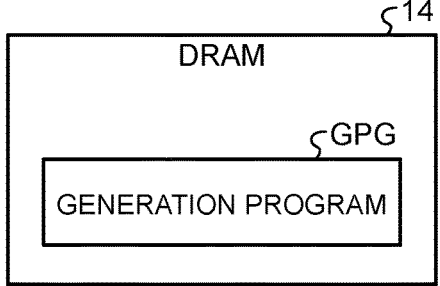
FIG. 5 is a schematic diagram for explaining an example of information stored in a DRAM of the generation device according to the embodiment.

The processor 11 is a computation device having a function to generate the index information IDX_argd. The processor 11 may be, for example, a CPU. In a case where the processor 11 is a CPU, the processor 11 implements the function to generate the index information IDX_argd by executing a predetermined computer program. Specifically, the processor 11 acquires the generation program GPG from a predetermined place, and loads the acquired generation program GPG into the DRAM 14 (see FIG. 5). Then, the processor 11 executes the search program SPG loaded in the DRAM 14. The processor 11 generates the index information IDX_argd under the control of the search program SPG.

Note that some of or all the functions of the processor 11 generating the index information IDX_argd may be implemented by a hardware circuit such as FPGA or ASIC.

In the example illustrated in FIG. 4, the generation device 1 receives data from an external device via the network 3 and the first interface 12, and outputs the data to the external device (the storage device 4) via the second interface 13. The reception of data and the output of data may be performed via the same interface. Moreover, the generation device 1 may include a storage device, and may acquire data from the storage device or output data to the storage device.

Moreover, in the example illustrated in FIG. 4, the generation device 1 is assumed to be a device different from the search device 2. The search device 2 may function as the generation device 1 by executing the generation program GPG in the search device 2.

Figure 6:
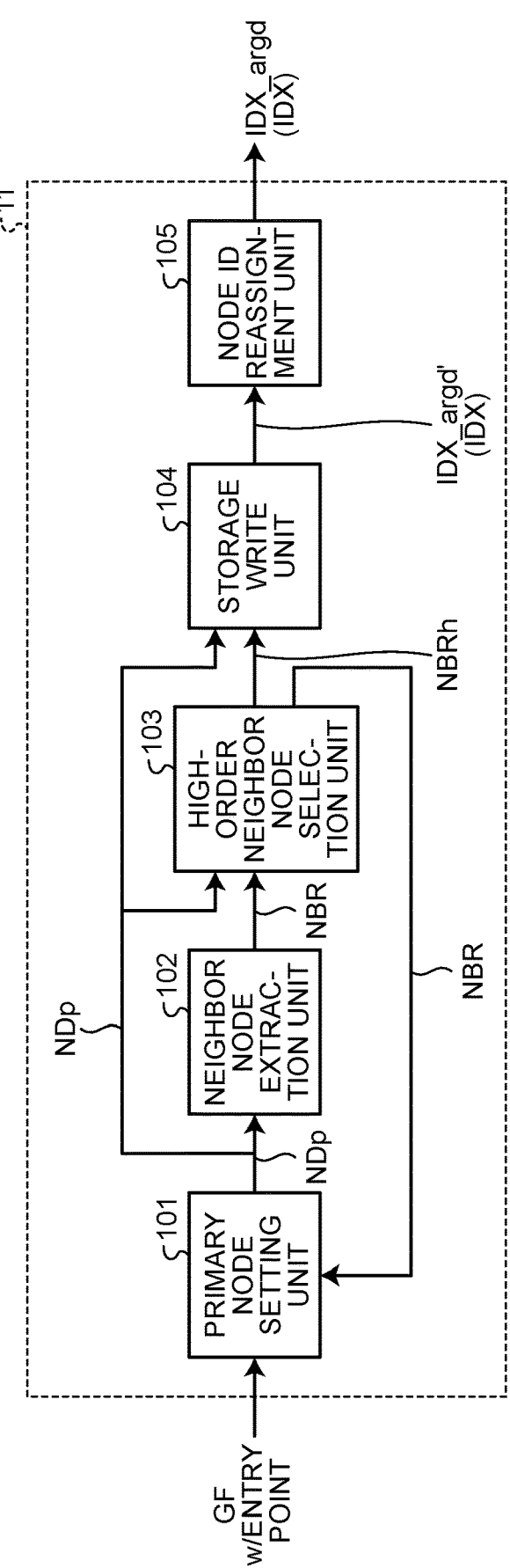
FIG. 6 is a schematic diagram illustrating an example of functions implemented by a processor included in the generation device according to the embodiment.

FIG. 6 is a schematic diagram illustrating an example of functions implemented by the processor 11 included in the generation device 1 according to the embodiment.

The processor 11 functions as a primary node setting unit 101, a neighbor node extraction unit 102, a high-order neighbor node selection unit 103, a storage write unit 104, and a node ID reassignment unit 105.

The primary node setting unit 101 receives the graph GF and an entry point. According to the configuration example illustrated in FIG. 4, the graph GF and the entry point are input to the primary node setting unit 101 via the network 3 and the first interface 12.

Note that the primary node setting unit 101 can receive optional information as the graph GF as long as the information indicates the structure of the graph GF. For example, the index information IDX_org may be input as the graph GF to the primary node setting unit 101.

The starting point is a node selected in an optional manner from among nodes defined by the graph GF. The index element related to the node of the entry point is arranged at the head of the index information IDX_argd by subsequent processing. In the search operation, the entry point is used as an initial search target node.

The primary node setting unit 101 sets, as the primary node NDp, each of the neighbor node NBR and the non-selected neighbor node NBR of one or more high-order neighbor nodes NBRh input to itself by the entry point and subsequent processing. The primary node NDp is a node whose index element is written at the head of one unit storage area. The primary node NDp set by the primary node setting unit 101 is input to the neighbor node extraction unit 102, the high-order neighbor node selection unit 103, and the storage write unit 104.

The neighbor node extraction unit 102 extracts all the neighbor nodes NBR of the primary node NDp from the graph GF. The all neighbor nodes NBR extracted by the neighbor node extraction unit 102 are input to the high-order neighbor node selection unit 103.

The high-order neighbor node selection unit 103 selects the high-order neighbor node NBRh from the neighbor nodes NBR on the basis of the input primary node NDp and the neighbor node NBR. The high-order neighbor node NBRh is a node whose index element is written in the same unit storage area as the index element of the primary node NDp. For example, in a case where the unit storage area has a size capable of storing M index elements (where M is an integer of two or more), the high-order neighbor node selection unit 103 selects (M−1) high-order neighbor nodes NBRh for one primary node NDp. Then, a total of M index elements including the index element of the one primary node NDp and the index elements of the (M−1) high-order neighbor nodes NBRh are written in one unit storage area by the storage write unit 104 at the subsequent stage.

The high-order neighbor node NBRh selected by the high-order neighbor node selection unit 103 is input to the storage write unit 104. Among the neighbor nodes NBR of the high-order neighbor node NBRh selected by the high-order neighbor node selection unit 103 and the neighbor nodes NBR of the primary node NDp, the remaining neighbor nodes NBR, which is not selected by the high-order neighbor node selection unit 103, are input to the primary node setting unit 101.

The storage write unit 104 writes the index element of the primary node NDp to one unit storage area together with the index element of the high-order neighbor node NBRh. With this write process, the index element related to the primary node NDp and the index element related to the high-order neighbor node NBRh are written to an area corresponding to the unit storage area of the storage destination in the storage device 4. The storage write unit 104 repeats writing to the area corresponding to each unit storage area, whereby the index information IDX_argd' is completed in the storage device 4.

The index information IDX_argd' is in a state of being arranged in an order different from the order of the node IDs by the processing so far. The node ID reassignment unit 105 reassigns the node ID to each data D in the data set DS so as to correspond to the arrangement order of the index elements in the index information IDX_argd'. Then, the generation of the index information IDX_argd ends.

Note that some of or all the primary node setting unit 101, the neighbor node extraction unit 102, the high-order neighbor node selection unit 103, the storage write unit 104, and the node ID reassignment unit 105 may be implemented by a hardware circuit.

Next, the operation of the generation device 1 of the embodiment will be described.

FIG. 7 is a flowchart illustrating an example of the operation of the generation device 1 according to the embodiment.

Upon receiving the directed graph GF and the entry point (S101), the primary node setting unit 101 sets the entry point as the primary node NDp (S102). The neighbor node extraction unit 102 extracts all the neighbor nodes NBR connected to the primary node NDp from the directed graph GF (S103).

The high-order neighbor node selection unit 103 selects, as the high-order neighbor node NBRh, (M−1) neighbor nodes NBR from among all the neighbor nodes NBR of the primary node NDp (S104). In S104, M is the number of index elements that can be written per unit storage area. Note that the method of selecting the (M−1) neighbor nodes NBR is not limited to a specific method. Moreover, the selection method in a case where the number of neighbor nodes NBRs is less than (M−1) is not limited to a specific method.

The storage write unit 104 writes the index element of the primary node NDp and the index elements of the (M−1) high-order neighbor nodes NBRh selected by the processing of S104 to one unit storage area (S105). The storage write unit 104 writes an index element related to the primary node NDp to the head of the one unit storage area, and writes index elements of (M−1) high-order neighbor nodes NBRh to a remaining area of the one unit storage area.

As long as the storage write unit 104 selects a unit storage area to which writing is not yet performed out of the unit storage areas in S105, the method of selecting the unit storage area of the write destination is not limited to a specific method.

The primary node setting unit 101 sets, as a next primary node NDp, the neighbor node NBR not selected as the high-order neighbor node NBRh and the neighbor node NBR of the high-order neighbor node NBRh. Before that, the primary node setting unit 101 determines whether the neighbor node NBR not selected as the high-order neighbor node NBRh or the neighbor node NBR of the high-order neighbor node NBRh remains without being set as the primary node NDp (S106).

In a case where the neighbor node NBR not selected as the high-order neighbor node NBRh or the neighbor node NBR of the high-order neighbor node NBRh remains (S106: Yes), the primary node setting unit 101 sets all the neighbor nodes NBR not selected as the high-order neighbor node NBRh or the neighbor nodes NBR of the high-order neighbor node NBRh as new primary nodes NDp (S107). Note that a method of selecting a node set as the new primary node NDp from the remaining neighbor nodes NBR is not limited to a specific method.

After the processing of S107, the processing of S103 is executed again. That is, a series of processing from S107 to S103 and to S106 constitute a loop process. This loop processing is referred to as a first operation. In a case where multiple nodes are each set as the primary node NDp in the processing of S107, the first operation is executed for each of the primary nodes NDp.

In the processing of S104 in one of the first operations repeated multiple times, when the number of neighbor nodes NBR selectable as the high-order neighbor node NBRh is insufficient, the high-order neighbor node selection unit 103 may select the high-order neighbor node NBRh from among the remaining non-selected neighbor nodes NBR for convenience. Alternatively, in the processing of S104, in a case where the number of neighbor nodes NBR selectable as the high-order neighbor node NBRh is insufficient, the high-order neighbor node selection unit 103 may select the number of nodes less than (M−1) as the high-order neighbor nodes NBRh.

In this way, index elements of nodes including the primary node NDp are written to any unit storage area by one first operation. In the next first operation, index elements of nodes are written to another unit storage area out of nodes to which index elements have not yet been written. The first operation is repeated until the index elements of all the nodes have been written and thereby becoming No in the determination processing of S106.

In a case of No in the determination processing of S106, the index information IDX_argd' is completed in the storage device 4. The node ID reassignment unit 105 reassigns the node ID to each data D constituting the data set DS (S108), and the operation of the generation device 1 of the embodiment is completed.

Figure 8:
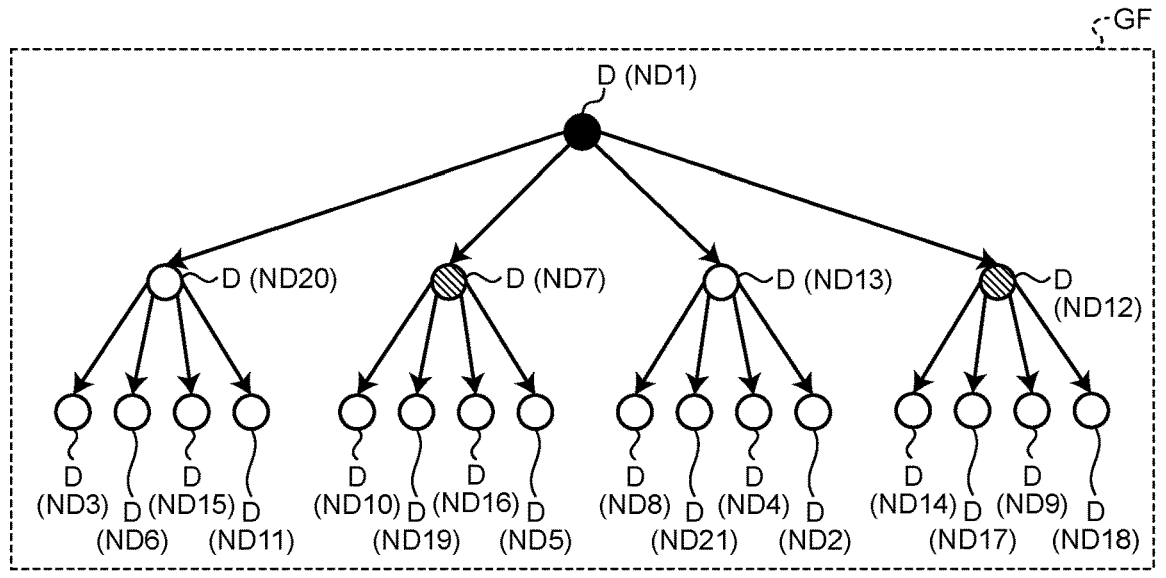
FIG. 8 is a schematic diagram for explaining a specific example of a process of generating index information from a directed graph by the generation device according to the embodiment.
Figure 9:
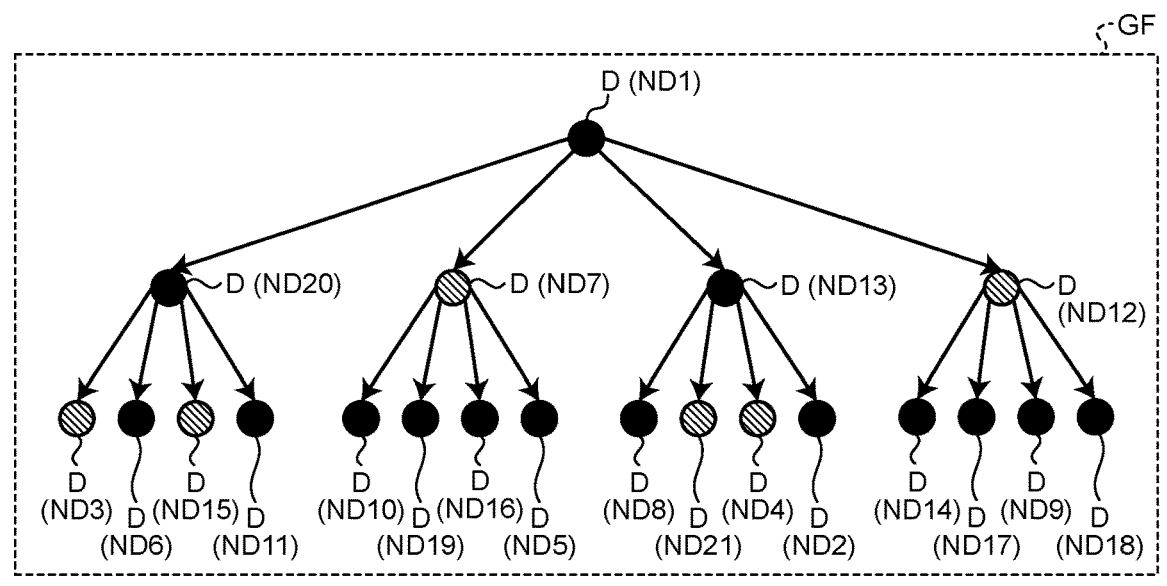
FIG. 9 is a schematic diagram for explaining another specific example of a process of generating index information from the directed graph by the generation device according to the embodiment.
Figure 10:
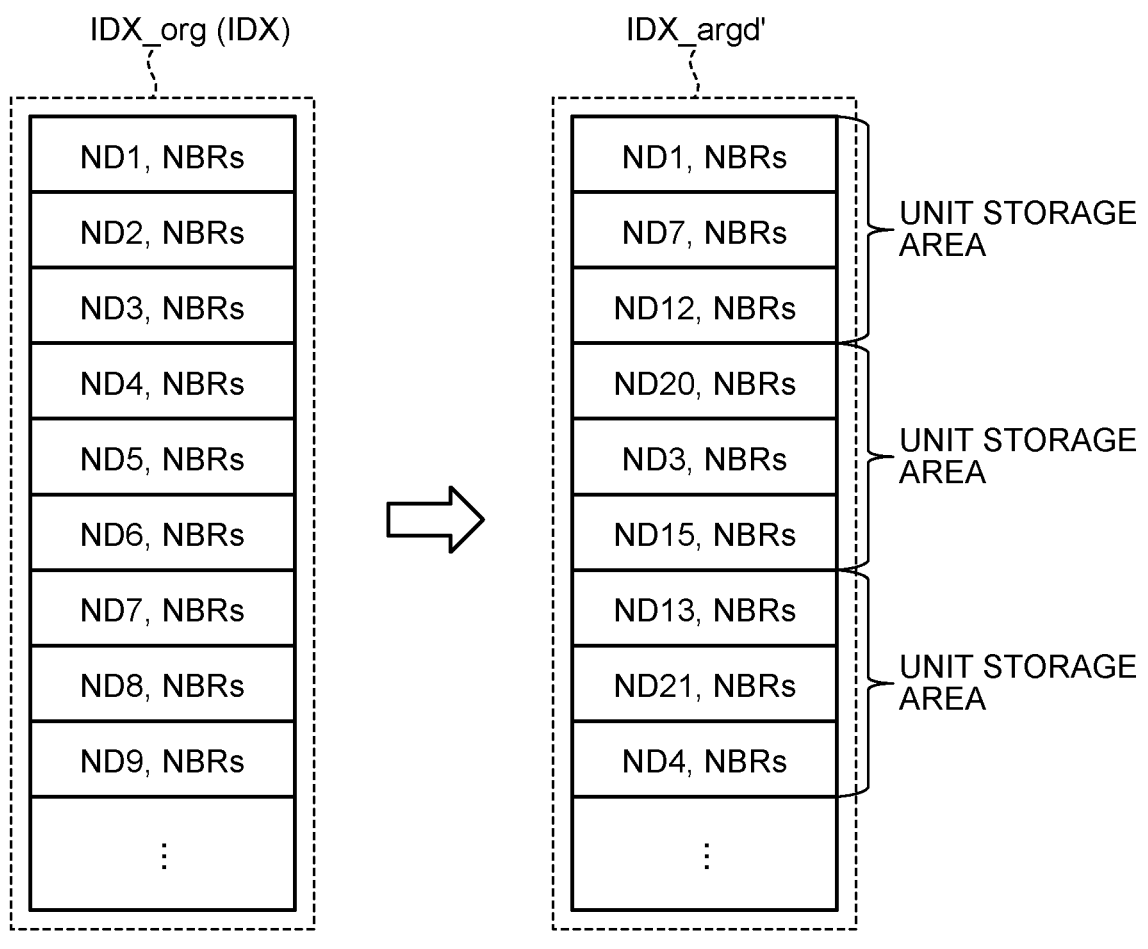
FIG. 10 is a diagram illustrating an example of index information generated by repeating a first operation multiple times in the embodiment.

FIGS. 8, 9, and 10 are schematic diagrams for explaining a specific example of a process of generating the index information IDX_argd from the directed graph GF by the generation device 1 of the embodiment. As an example, it is assumed that the node ND1 is set as an entry point. Moreover, three index elements are stored in the unit storage area. Thus, M is three. Description will be made in association with each processing in the flowchart of FIG. 7.

As illustrated in FIG. 8, the generation device 1 first sets the node ND1 as the primary node NDp by the above-described processing of S102. Then, the generation device 1 selects the node ND7 and the node ND12 as the two high-order neighbor nodes NBRh from the node ND20, the node ND7, the node ND13, and the node ND12 which are the neighbor nodes NBR of the node ND1 set as the primary node NDp by the processing of S103 and S104. Here, three index elements can be written per unit storage area (that is, M is three). Therefore, the index element of the node ND1 which is the primary node NDp is written at the head of a unit storage area, and the index element of the node ND7 and the index element of the node ND12 are written in an area subsequent to the area in the unit storage area, to which the index element of the node ND1 is written.

Subsequently, the generation device 1 sequentially sets, as the primary node NDp, one of the node ND20 and the node ND13 that have not been selected as the high-order neighbor node NBRh and the node ND10, the node ND19, the node ND16, the node ND5, the node ND14, the node ND17, the node ND9, and the node ND18 that are neighbor nodes of any of the node ND7 and the node ND12 selected as the high-order neighbor node NBRh (S107), and repeats the first operation. That is, as illustrated in FIG. 9, the node ND20, the node ND13, the node ND10, the node ND19, the node ND16, the node ND5, the node ND14, the node ND17, the node ND9, and the node ND18 are primary nodes NDp.

In the example illustrated in FIG. 9, in a first operation by which the node ND20 is set as the primary node NDp out of the first operations executed multiple times, the generation device 1 selects the node ND3 and the node ND15 as the two high-order neighbor nodes NBRh from among the node ND3, the node ND6, the node ND15, and the node ND11 which are the neighbor nodes NBR of the node ND20 by the processing of S103 and S104. Each of the node ND6 and the node ND11 not selected as the high-order neighbor node NBRh is set as the primary node NDp in the following first operation.

Moreover, in the example illustrated in FIG. 9, in a first operation by which the node ND13 is set as the primary node NDp out of the first operations executed multiple times, the generation device 1 selects the node ND21 and the node ND4 as the two high-order neighbor nodes NBRh from among the node ND8, the node ND21, the node ND4, and the node ND2 which are the neighbor nodes NBR of the node ND13 by the processing of S103 and S104. Each of the node ND8 and the node ND2 not selected as the high-order neighbor node NBRh is set as the primary node NDp in the following first operation.

FIG. 10 is a diagram illustrating an example of the index information IDX_argd' generated by repeating the first operation of the embodiment multiple times. In the drawing, index information IDX_org is illustrated for comparison.

According to the index information IDX_org, the index elements of the respective nodes are arranged in the order of the node ID. On the other hand, according to the index information IDX_argd', each index element is arranged such that the index element of a node and the index element of the neighbor node NBR of this node are written to the same unit storage area.

In the example illustrated in FIG. 10, the index element of the node ND1 and the index elements of the node ND7 and the node ND12, which are the neighbor nodes NBR of the node ND1, are written to the same unit storage area. Therefore, for example, when the search program SPG issues an IO request for acquiring the index elements of the node ND1 from the SSD 23 in a state where the node ND1 is the search target node, it is possible to collectively acquire the index elements of the node ND7 and the node ND12, which are the neighbor nodes of the node ND1, in addition to the index elements of the node ND1. Then, the search program SPG stores the index elements of the node ND1, the node ND7, and the node ND12 in the cache area 241. The search program SPG sets one of the node ND20, the node ND7, the node ND13, and the node ND12 as a next search target node of the node ND1. In a case where the search program SPG temporarily sets the node ND7 or the node ND12 as the search target node, the search program SPG can acquire the index element of the search target node from the cache area 241.

As described above, the generation device 1 according to the embodiment writes the index element of a node and the index element of the neighbor node NBR of this node to the same unit storage area. Therefore, in a case where the search device 2 performs the search operation using the index information IDX_argd generated by the generation device 1, the index element of the node that can be the next search target node can be stored in the cache area 241 for each hop operation. As a result, it is possible to increase the cache hit rate as compared with a case where the index information IDX_org is used.

The SSD 23 of the search device 2 stores the index information IDX_argd generated by the generation device 1. Then, the search device 2 executes a search operation on the basis of the index information IDX_argd.

Figure 11:
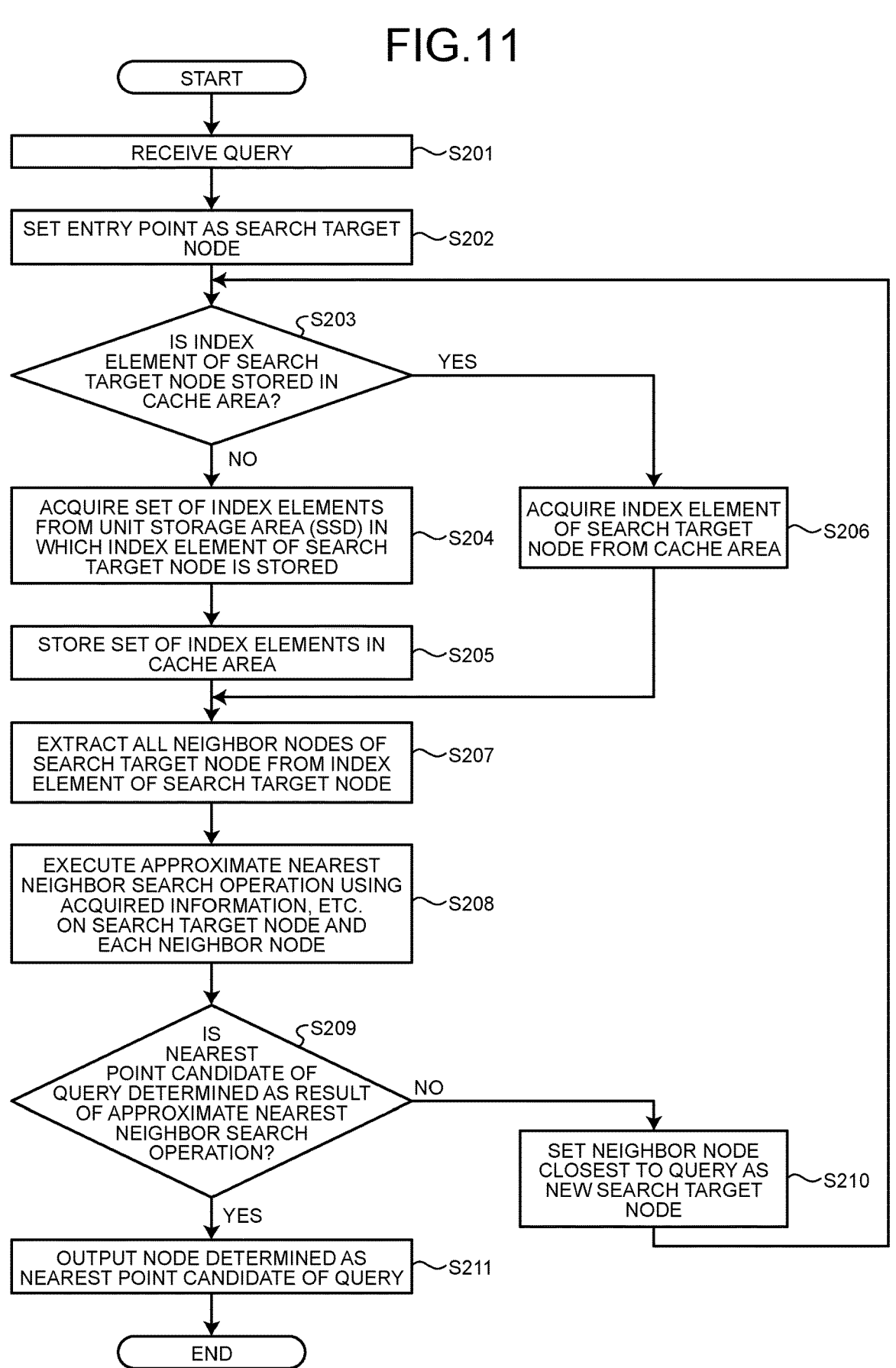
FIG. 11 is a flowchart illustrating an example of a search operation by the search device according to the embodiment.

FIG. 11 is a flowchart illustrating an example of a search operation by the search device 2 according to the embodiment.

Upon receiving the query (S201), the search program SPG sets the entry point as a search target node (S202). Then, the search program SPG determines whether or not the index element of the search target node is stored in the cache area 241 (S203).

In a case where the index element of the search target node is not stored in the cache area 241 (S203: No), the search program SPG acquires a set of all index elements stored in the unit storage area in which the index element of the search target node is stored from the unit storage area, by issuing an IO request to the operating system (S204). Then, the search program SPG stores all the index elements of the set of index elements in the cache area 241 (S205).

In a case where the index element of the search target node is stored in the cache area 241 (S203: Yes), the search program SPG acquires the index element of the search target node from the cache area 241 (S206).

After the processing of S205 or the processing of S206, the search program SPG extracts all the neighbor nodes NBR of the search target node from the index element of the search target node (S207).

The search program SPG performs an approximate nearest neighbor search operation using the acquired information or the like on the search target node and each neighbor node NBR (S208). As the operation of the approximate nearest neighbor search, for example, an existing optional operation method including a method of determining a next search target node such as Greedy search or Beam search, distance calculation with a query using compressed data Dc necessary for this operation, and the like can be adopted.

As a result of the approximate nearest neighbor search operation, in a case where a node to be a nearest point candidate of the query is not determined and a search target node is newly generated (S209: No), the search program SPG sets, as a new search target node, the neighbor node NBR closest to the query out of the neighbor nodes NBRs (S210). That is, the search program SPG executes switching of the search target node. After S210, the search program SPG executes the series of processing from S203 again.

As a result of the approximate nearest neighbor search operation, in a case where a node to be the nearest point candidate of the query is decided (S209: Yes), the search program SPG outputs information on the node, which has been determined to be the nearest point candidate of the query, as the consequence of the search operation (S211). Then, the search operation ends.

As described above, according to the embodiment, the generation device 1 sets one of the nodes included in the directed graph GF corresponding to pieces of data D constituting the data set DS as the primary node NDp (see, for example, S102 or S107 in FIG. 7). Then, on the basis of the directed graph GF, the generation device 1 selects (M−1) high-order neighbor nodes NBRh from among one or more neighbor nodes NBR of the node set as the primary node NDp (see, for example, S103 and S104 in FIG. 7). The generation device 1 writes the index information of the node set as the primary node NDp and the index information of each of the (M−1) nodes selected as the high-order neighbor node NBRh to one unit storage area (see, for example, S105 in FIG. 7). The unit storage area is a unit of access to a storage device (for example, the SSD 23).

Therefore, it is possible to enhance the cache hit rate at the time of acquiring the index element in the search operation using the index information IDX_argd generated by the generation device 1. As a result, the time required for the search operation is shortened. Therefore, according to the embodiment, it is possible to obtain the index information IDX enabling a high-speed search operation.

According to the embodiment, the generation device 1 executes the first operation multiple times (for example, see a series of processing from S107 to S103 and back to S106 in FIG. 7). Each first operation includes processing of setting the primary node NDp, processing of selecting (M−1) high-order neighbor nodes NBRh, and processing of writing index information of a node set as the primary node NDp and index information of each of (M−1) nodes selected as the high-order neighbor nodes NBRh to one unit storage area. In the first operation executed at the second and subsequent times of the multiple times of first operations, the generation device 1 sets all the neighbor node NBR that has not been selected as the high-order neighbor node NBRh in any one of the previous first operations and the neighbor node NBR of the neighbor node NBR selected as the high-order neighbor node NBRh as the primary node NDp, and sequentially performs the first operation on each primary node NDp (see, for example, S107 in FIG. 7).

Moreover, according to the embodiment, the generation device 1 writes the index information of the node set as the primary node NDp and the index information of each of the (M−1) nodes selected as the high-order neighbor node NBRh to different unit storage areas in each of the first operations.

Moreover, according to the embodiment, the index information IDX_argd corresponding to the directed graph GF is stored in the SSD 23 of the search device 2. The index information IDX_argd is configured such that an index element of a node and an index element of a neighbor node NBR of this node are stored in at least one unit storage area out of unit storage areas of the SSD 23. In the search device 2, in a case where the index element of the search target node is stored in the cache area 241 at the time of setting the search target node along the directed graph GF, the search program SPG acquires the index element of the search target node from the cache area 241 (see, for example, S206 in FIG. 11). In a case where the index element of the search target node is not stored in the cache area 241, the search program SPG acquires a set of index elements including the index element of the search target node from the unit storage area in which the index element of the search target node is stored out of the unit storage areas (see, for example, S204 in FIG. 11), and stores the acquired set of index elements in the cache area 241 (see, for example, S205 in FIG. 11). Then, the search program SPG sets a new search target node on the basis of the index element of the search target node (see, for example, S210 in FIG. 11).

Therefore, the search program SPG can store the index element of the node that can be selected as the search target node next in the cache area 241 in advance for each hop operation, thereby enhancing the cache hit rate. Therefore, the time required for the search operation is shortened.

Some modified examples that can be applied to the embodiments will be described below. Hereinafter, the same matters as those in the above embodiment will be briefly described or description thereof will be omitted.

First Modified Example

According to the first modified example, the processor 11 included in the generation device 1 includes a high-order neighbor node selection unit 103a in place of the high-order neighbor node selection unit 103 with regard to the function of generating the index information IDX_argd.

Figure 12:
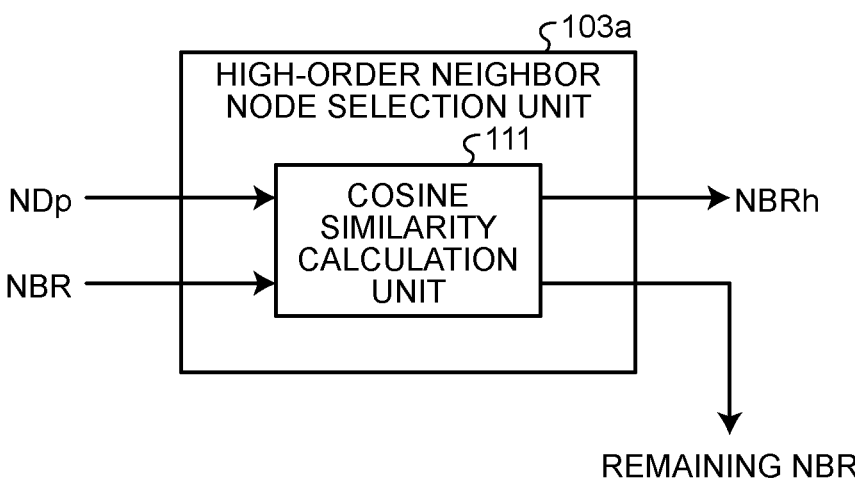
FIG. 12 is a schematic diagram illustrating an example of details of a function of a high-order neighbor node selection unit according to a first modified example.

FIG. 12 is a schematic diagram illustrating an example of details of a function of the high-order neighbor node selection unit 103a of the first modified example.

The high-order neighbor node selection unit 103a includes a cosine similarity calculation unit 111. The cosine similarity calculation unit 111 calculates a difference vector for each neighbor node NBR on the basis of the primary node NDp and the neighbor nodes NBR. Then, the cosine similarity calculation unit 111 selects (M−1) high-order neighbor nodes NBRh on the basis of the angle formed between the difference vectors.

Note that, when M is three or more, in other words, when two or more high-order neighbor nodes NBRh are to be selected, the cosine similarity calculation unit 111 selects the high-order neighbor node NBRh based on the angle formed between the difference vectors. The cosine similarity calculation unit 111 uses the cosine similarity as an example of an angle index. Note that the index of the angle used to select the high-order neighbor node NBRh is not limited to the cosine similarity.

Figure 13:
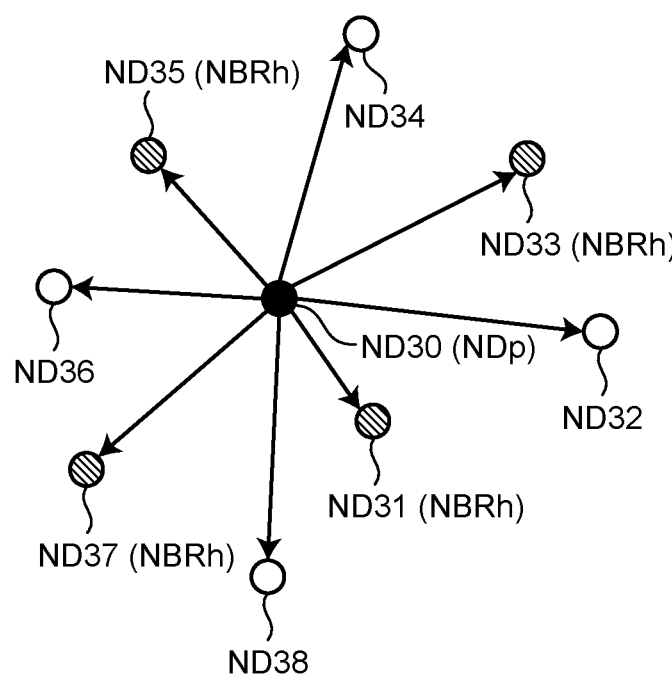
FIG. 13 is a schematic diagram for explaining an example of a selection method by a cosine similarity calculation unit of the first modified example.

FIG. 13 is a schematic diagram for describing an example of a selection method by the cosine similarity calculation unit 111 of the first modified example. In the example illustrated in the drawing, the node ND30 is set as the primary node NDp. and a total of 8 nodes of the nodes ND31 to ND38 are defined as the neighbor nodes NBR of the node ND30.

The cosine similarity calculation unit 111 calculates a difference vector between the node ND31 and the node ND30, a difference vector between the node ND32 and the node ND30, a difference vector between the node ND33 and the node ND34 and the node ND30, a difference vector between the node ND35 and the node ND30, a difference vector between the node ND36 and the node ND30, a difference vector between the node ND37 and the node ND30, and a difference vector between the node ND38 and the node ND30.

Each difference vector represents an edge from the node ND30 toward one neighbor node NBR. On the basis of the cosine similarity between the difference vectors, the cosine similarity calculation unit 111 selects (M−1) high-order neighbor nodes NBRh such that (M−1) edge directions from the node ND30 to (M−1) high-order neighbor nodes NBRh are not biased as much as possible.

In the example illustrated in FIG. 13, M is five. Then, the node ND31, the node ND33, the node ND35, and the node ND37 are selected as the high-order neighbor nodes NBRh. It can be seen from this figure that directions of edges disperse among the edge from the node ND30 to the node ND31, the edge from the node ND30 to the node ND33, the edge from the node ND30 to the node ND35, and the edge direction from the node ND30 to the node ND37.

Figure 14:
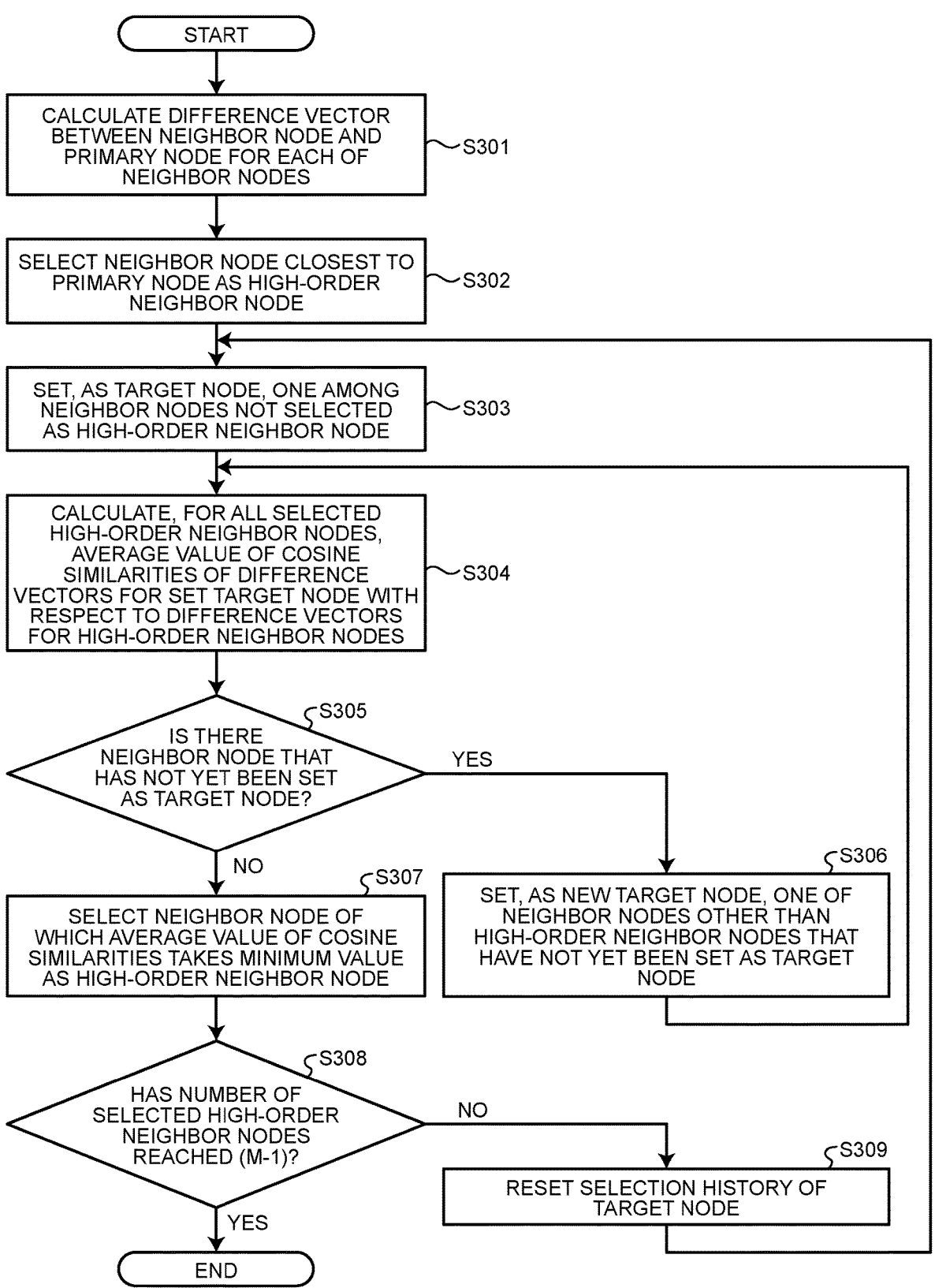
FIG. 14 is a flowchart illustrating an example of an operation of a high-order neighbor node selection unit according to the first modified example.

FIG. 14 is a flowchart illustrating an example of an operation of the high-order neighbor node selection unit 103a of the first modified example. A series of operations illustrated in FIG. 7 is executed, for example, in the processing of S104 of FIG. 7.

First, the cosine similarity calculation unit 111 calculates a difference vector between the neighbor node NBR and the primary node NDp for each of the input neighbor nodes NBR (S301). Then, the cosine similarity calculation unit 111 selects the neighbor node NBR closest to the primary node NDp as the high-order neighbor node NBRh (S302).

Subsequently, the cosine similarity calculation unit 111 sets, as the target node, one neighbor node NBR which is not set as the primary node NDp out of the input neighbor nodes NBR and is not selected as the high-order neighbor node NBRh (S303). The cosine similarity calculation unit 111 calculates, for all the selected high-order neighbor nodes NBRh, an average value of cosine similarities of difference vectors for the set target node with respect to difference vectors for the high-order neighbor nodes NBRh (S304).

The cosine similarity calculation unit 111 determines whether or not there is a neighbor node NBR that has not yet been set as a target node out of neighbor nodes NBRs that have not been set as the primary node NDp and the high-order neighbor node NBRh out of the input neighbor nodes NBR (S305). In a case where there is a neighbor node NBR that has not yet been set as the target node (S305: Yes), the cosine similarity calculation unit 111 sets one of the neighbor nodes NBR that have not yet been set as the target node as a new target node (S306). Then, the cosine similarity calculation unit 111 again executes the series of processing from S304.

In a case where there is no neighbor node NBR that has not yet been set as the target node (S305: No), the cosine similarity calculation unit 111 selects the neighbor node NBR of which the average value of the cosine similarities takes the minimum value as the high-order neighbor node NBRh (S307).

The cosine similarity calculation unit 111 determines whether or not the number of selected high-order neighbor nodes NBRh has reached (M−1) (S308). When the number of the selected high-order neighbor nodes NBRh has not reached (M−1) (S308: No), the cosine similarity calculation unit 111 resets a selection history of the target node (S309), and executes the series of processing from S303 again.

In a case where the number of selected high-order neighbor nodes NBRh reaches (M−1) (S308: Yes), the high-order neighbor node selection unit 103a ends the operation of selecting the high-order neighbor node NBRh.

Note that FIG. 14 is an example of a method of selecting (M−1) high-order neighbor nodes NBRh such that the directions of the difference vectors related to the high-order neighbor nodes NBRh are not biased as much as possible. The method of selecting the (M−1) high-order neighbor nodes NBRh based on the angle between the difference vectors by the cosine similarity calculation unit 111 is not limited thereto.

As described above, according to the first modified example, the generation device 1 selects (M−1) high-order neighbor nodes NBRh on the basis of the angle between two of the difference vectors, each of which is a difference vector between one of the neighbor nodes NBR and the primary node NDp.

When the (M−1) high-order neighbor nodes NBRh are selected so that the directions of the difference vectors related to the high-order neighbor nodes NBRh are not biased as much as possible, it is possible to select the path of the hop operation so that the query is as closer as possible in any direction as viewed from the search target node in each hop operation.

Second Modified Example

In the second modified example, the processor 11 included in the generation device 1 includes a high-order neighbor node selection unit 103b in place of the high-order neighbor node selection unit 103 in the function of generating the index information IDX_argd.

Figure 15:
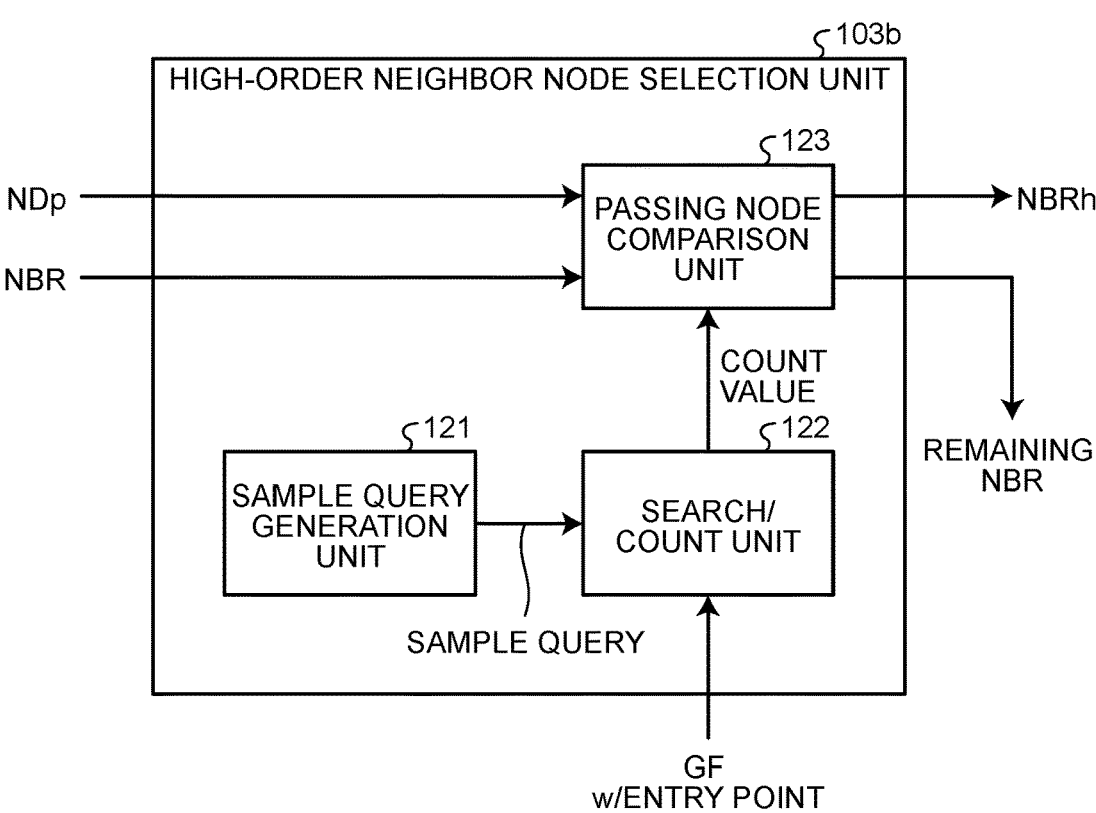
FIG. 15 is a schematic diagram illustrating an example of details of a function of a high-order neighbor node selection unit according to a second modified example.

FIG. 15 is a schematic diagram illustrating an example of details of a function of the high-order neighbor node selection unit 103b of the second modified example.

The high-order neighbor node selection unit 103b includes a sample query generation unit 121, a search/count unit 122, and a passing node comparison unit 123.

The sample query generation unit 121 generates queries (denoted as sample queries) for trial of the search operation. A method of generating the sample queries is not limited to a specific method. It is desirable to generate the sample queries so as to disperse at regular intervals in the entire space where the data set DS exists. As a result, the sample queries are widely dispersed.

The search/count unit 122 executes a search operation for each of the sample queries generated by the sample query generation unit 121 by using the directed graph GF and the entry point. The search/count unit 122 may use the index information IDX_org as the information indicating the directed graph GF. The search/count unit 122 counts the number of times of passage of each node on the basis of the route through which the search target node has passed along the directed graph GF by the search operation for each of the sample queries. The count value of the number of times of passage of each node is input to the passing node comparison unit 123.

The passing node comparison unit 123 selects, as the (M−1) high-order neighbor nodes NBRh, (M−1) high-order neighbor nodes NBRs with a large number of times of passing, from among the one or more neighbor nodes NBR of the primary node NDp.

Figure 16:
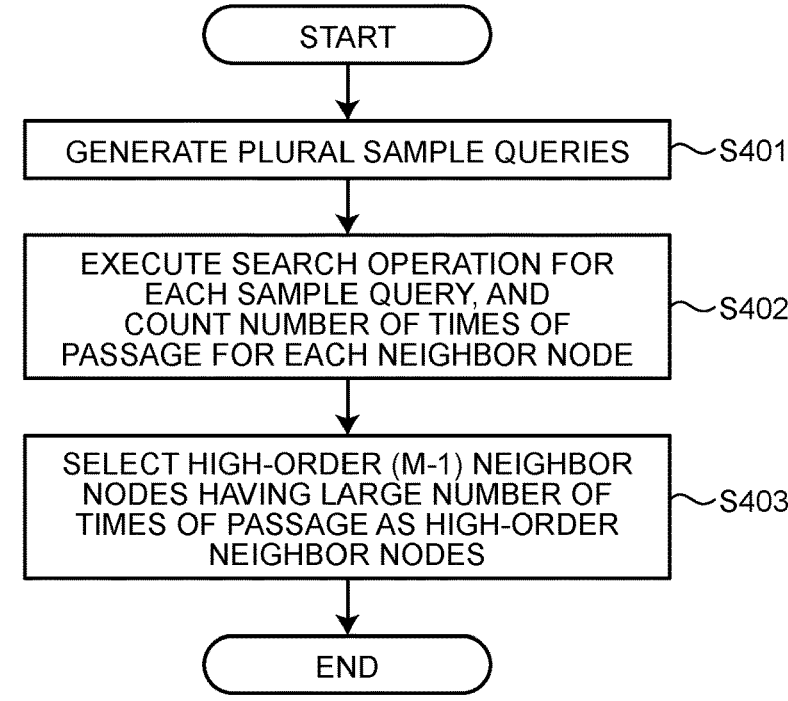
FIG. 16 is a flowchart illustrating an example of an operation of the high-order neighbor node selection unit according to the second modified example.

FIG. 16 is a flowchart illustrating an example of an operation of the high-order neighbor node selection unit 103b of the second modified example. A series of operations illustrated in FIG. 7 is executed, for example, in the processing of S104 of FIG. 7.

First, the sample query generation unit 121 generates sample queries (S401). The search/count unit 122 executes a search operation for each sample query, and counts the number of times of passage for each neighbor node NBR (S402). The passing node comparison unit 123 selects high-order (M−1) neighbor nodes NBR with a large number of times of passage from among one or more neighbor nodes NBR of the primary node NDp as (M−1) high-order neighbor nodes NBRh (S403). Then, the high-order neighbor node selection unit 103b ends the operation of selecting the high-order neighbor node NBRh.

Note that, in the series of operations illustrated in this drawing, the processing of S402 and S403 may not necessarily be executed for each primary node NDp. For example, the search/count unit 122 executes a search operation for each of the sample queries, and counts the number of times of passage for each of all the nodes included in the directed graph GF. Then, when the search operation and the counting of the number of times of passage are completed for all the sample queries, the search/count unit 122 stores a count value for each node. Then, in the processing of S104 of FIG. 7, the search/count unit 122 may input the count value of the neighbor node out of the already stored count values for each node to the passing node comparison unit 123 without executing the search operation.

As described above, according to the second modified example, the generation device 1 generates sample queries and performs a search operation of searching for a node closest to each of the sample queries. Then, the generation device 1 selects, as (M−1) high-order neighbor nodes NBRh, (M−1) neighbor nodes NBR with the largest total number of times of passage by the search operation related to the sample queries.

With the above configuration, the index element of the neighbor node NBR which is likely to be set as the search target node is preferentially written to the same unit storage area as the index element of the primary node NDp. Therefore, the cache hit rate is further enhanced, and the time required for the search operation is further shortened.

Third Modified Example

In the third modified example, the processor 11 included in the generation device 1 includes a high-order neighbor node selection unit 103c in place of the high-order neighbor node selection unit 103 in the function of generating the index information IDX_argd.

Figure 17:
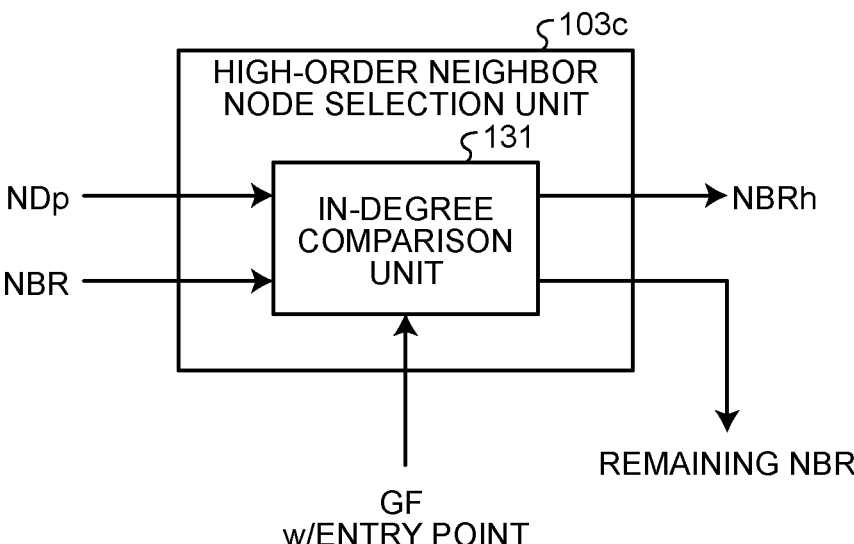
FIG. 17 is a schematic diagram illustrating an example of details of a function of a high-order neighbor node selection unit according to a third modified example.

FIG. 17 is a schematic diagram illustrating an example of details of a function of the high-order neighbor node selection unit 103c of the third modified example.

The high-order neighbor node selection unit 103c includes an in-degree comparison unit 131.

The in-degree comparison unit 131 selects (M−1) high-order neighbor nodes NBRh on the basis of the comparison of the in-degrees of the neighbor nodes NBR by using the directed graph GF and the entry point.

Figure 18:
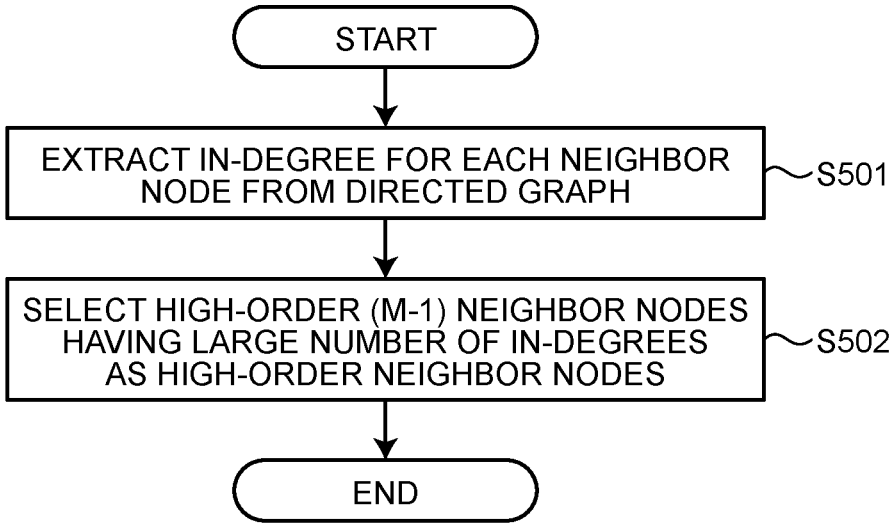
FIG. 18 is a flowchart illustrating an example of an operation of the high-order neighbor node selection unit according to the third modified example.

FIG. 18 is a flowchart illustrating an example of an operation of the high-order neighbor node selection unit 103c of the third modified example. A series of operations illustrated in FIG. 7 is executed, for example, in the processing of S104 of FIG. 7.

First, the in-degree comparison unit 131 specifies the in-degree for each neighbor node NBR on the basis of the directed graph GF (S501). The in-degree comparison unit 131 selects high-order (M−1) neighbor nodes NBR with a large number of in-degrees as (M−1) high-order neighbor nodes NBRh (S502). Then, the high-order neighbor node selection unit 103c ends the operation of selecting the high-order neighbor node NBRh.

According to the third modified example, the generation device 1 specifies the in-degree for each of the neighbor nodes NBR on the basis of the directed graph GF. Then, the generation device 1 selects high-order (M−1) neighbor nodes NBR with a large number of in-degrees as (M−1) high-order neighbor nodes NBRh.

It is considered that a node with a larger number of in-degrees is more likely to be set as a search target node in the search operation. According to the third modified example, the index element of the neighbor node NBR with a large number of in-degrees is preferentially written to the same unit storage area as the index element of the primary node NDp. Therefore, the cache hit rate is further enhanced, and the time required for the search operation is further shortened.

While certain embodiments have been described, these embodiments have been presented by way of example only, and are not intended to limit the scope of the inventions. Indeed, the novel embodiments described herein may be embodied in a variety of other forms; moreover, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A generation method implemented by a computer including a processor, a first interface, and a second interface, the generation method comprising:

receiving, via the first interface, a directed graph;

setting one of multiple first nodes as a second node, the multiple first nodes being included in the directed graph and corresponding to vectors included in a search range;

selecting (M−1) fourth nodes (M is an integer of two or more) from among one or more third nodes on the basis of the directed graph, each of the third nodes being an out-neighbor node of the second node in the multiple first nodes;

writing, via the second interface, to a first storage area of a storage device, the storage device connected to the second interface, an information piece related to the second node and information pieces related to the (M−1) fourth nodes, the information piece related to the second node and the information pieces related to the (M−1) fourth nodes each being an index element related to one first node in index information corresponding to the directed graph, the index element including a vector value of the one first node and IDs of all out-neighbor nodes of the one first node, the first storage area being one of second storage areas of the storage device, the second storage areas being a unit of access to the storage device and having the same size; and executing multiple times of first operations until the writing for index elements related to all the first nodes are completed, each of the multiple times of first operations including the setting, the selecting, and the writing, wherein M information pieces written to any second storage area by the executing are able to be, when searching by a computer that comprises a cache memory, collectively acquired and stored into the cache memory, the information pieces stored in the cache memory are used in the searching by the computer.

2. The generation method according to claim 1, wherein the setting in a second operation being a first operation executed at second and subsequent times in the multiple times of first operations includes setting the second node from among one or more fifth nodes and one or more out-neighbor nodes of the (M−1) fourth nodes of the multiple first nodes, the one or more fifth nodes being one or more remaining first nodes after the (M−1) fourth nodes of the one or more third nodes are selected in the selecting in any first operation executed before the second operation.

3. The generation method according to claim 2, further comprising, in each of the multiple times of first operations, writing the information piece related to each of the second node and the (M−1) fourth nodes to a different second storage area in the second storage areas.

4. The generation method according to claim 1, wherein the number of the third nodes is two or more, and the M is three or more, the selecting includes selecting the (M−1) fourth nodes on the basis of an angle between two of difference vectors, and each of the difference vectors is a difference vector between the second node and one of the two or more third nodes.

5. The generation method according to claim 2, wherein the number of the third nodes is two or more, and the M is three or more, the selecting includes selecting the (M−1) fourth nodes on the basis of an angle between two of difference vectors, and each of the difference vectors is a difference vector between the second node and one of the two or more third nodes.

6. The generation method according to claim 3, wherein the number of the third nodes is two or more, and the M is three or more, the selecting includes selecting the (M−1) fourth nodes on the basis of an angle between two of difference vectors, and each of the difference vectors is a difference vector between the second node and one of the two or more third nodes.

7. The generation method according to claim 1, further comprising:

generating sample queries;

searching for a first node closest to each of the sample queries on the basis of the directed graph;

acquiring a total number of times of passage in the searching for each of the one or more third nodes; and selecting, as the (M−1) fourth nodes, high-order (M−1) third nodes with a large total number of times from among the one or more third nodes.

8. The generation method according to claim 2, further comprising:

generating sample queries;

searching for a first node closest to each of the sample queries on the basis of the directed graph;

acquiring a total number of times of passage in the searching for each of the one or more third nodes; and selecting, as the (M−1) fourth nodes, high-order (M−1) third nodes with a large total number of times from among the one or more third nodes.

9. The generation method according to claim 3, further comprising:

generating sample queries;

searching for a first node closest to each of the sample queries on the basis of the directed graph;

acquiring a total number of times of passage in the searching for each of the one or more third nodes; and selecting, as the (M−1) fourth nodes, high-order (M−1) third nodes with a large total number of times from among the one or more third nodes.

10. The generation method according to claim 1, further comprising:

specifying an in-degree for each of the one or more third nodes on the basis of the directed graph; and selecting, as the (M−1) fourth nodes, high-order (M−1) third nodes with a larger number of the in-degrees from among the one or more third nodes.

11. The generation method according to claim 2, further comprising:

specifying an in-degree for each of the one or more third nodes on the basis of the directed graph; and selecting, as the (M−1) fourth nodes, high-order (M−1) third nodes with a larger number of the in-degrees from among the one or more third nodes.

12. The generation method according to claim 3, further comprising:

specifying an in-degree for each of the one or more third nodes on the basis of the directed graph; and selecting, as the (M−1) fourth nodes, high-order (M−1) third nodes with a larger number of the in-degrees from among the one or more third nodes.

13. A search method implemented by a computer including a processor, a first memory, and a second memory configured to operate faster than the first memory, the search method comprising:

receiving a query;

setting a candidate of a first node closest to the received query along a directed graph, the directed graph including multiple first nodes corresponding to vectors in a search range, index information related to the directed graph being stored in the first memory before the receiving the query, the index information including first information pieces, each of the first information pieces including a vector value of one first node and IDs of all out-neighbor nodes of the one first node, the index information being configured such that a first information piece related to a second node being that is one of the multiple first nodes and a first information piece related to an out-neighbor node of the second node are stored in each of one or more second storage areas out of first storage areas, each of the first storage areas being a unit of access to the first memory and having the same size, performing a first operation including:

in a case where a second information piece that is a first information piece related to a node being that is the first node as the candidate is stored in a cache area of the second memory, acquiring the second information piece from the cache area, in a case where the second information piece is not stored in the cache area, acquiring third information pieces and storing the acquired third information pieces in the cache area, the third information pieces including the second information piece from a third storage area in which the second information piece is stored, the third storage area being part of the first storage areas, extracting all neighbor nodes of the third node from the third information pieces, and performing an approximate nearest neighbor search operation using information about the third node and the neighbor nodes, and in a case where the nearest point candidate of the query is decided, outputting information on a node as the nearest point candidate of the query, the node being determined by the approximate nearest neighbor search operation, and in a case where the nearest point candidate of the query is not decided, setting a new first node as a new candidate based on the third information piece and performing the first operation again.

14. A generation device comprising:

a first interface configured to receive a directed graph;

a second interface configured to be connectable to a storage device; and a processor configured to execute processing of:

receiving, via the first interface, the directed graph, setting one of multiple first nodes as a second node, the multiple first nodes being included in a directed graph and corresponding to vectors included in a search range, selecting (M−1) fourth nodes (M is an integer of two or more) from among one or more third nodes on the basis of the directed graph, each of the third nodes being an out-neighbor node of the second node in the multiple first nodes, writing, to a first storage area of the storage device, an information piece related to the second node and information pieces related to the (M−1) fourth nodes, the information piece related to the second node and the information pieces related to the (M−1) fourth nodes each being an index element related to one first node in index information corresponding to the directed graph, the index element including a vector value of the one first node and IDs of all out-neighbor nodes of the one first node, the first storage area being one of second storage areas of the storage device, the second storage areas being a unit of access to the storage device and having the same size, and executing multiple times of first operations until the writing for index elements related to all the first nodes are completed, each of the multiple times of first operations including the setting, the selecting, and the writing, wherein M information pieces written to any second storage area by the executing is able to be, when searching by a computer that comprises a cache memory, collectively acquired and stored into the cache memory, the information pieces stored in the cache memory is used in the searching by the computer.

15. The generation device according to claim 14, wherein the setting in a second operation being a first operation executed second and subsequent times in the multiple times of first operations includes setting the second node from among one or more fifth nodes and one or more out-neighbor nodes of the (M−1) fourth nodes of the multiple first nodes, the one or more fifth nodes being one or more remaining first nodes after the (M−1) fourth nodes of the one or more third nodes are selected in the selecting in any first operation executed before the second operation.

16. The generation device according to claim 15, wherein the processor is configured to, in each of the multiple times of first operations, execute processing of writing the information piece related to each of the second node and the (M−1) fourth nodes to a different second storage area in the second storage areas.

17. The generation device according to claim 14, wherein the number of the third nodes is two or more, and the M is three or more, the selecting includes selecting the (M−1) fourth nodes on the basis of an angle between two of difference vectors, and each of the difference vectors is a difference vector between the second node and one of the two or more third nodes.

18. The generation device according to claim 14, wherein the processor is configured to further execute processing of:

generating sample queries; searching for a first node closest to each of the sample queries on the basis of the directed graph;

acquiring a total number of times of passage in the searching for each of the one or more third nodes; and selecting, as the (M−1) fourth nodes, high-order (M−1) third nodes with a large total number of times from among the one or more third nodes.

19. The generation device according to claim 14, wherein the processor is configured to further execute processing of:

specifying an in-degree for each of the one or more third nodes on the basis of the directed graph; and selecting, as the (M−1) fourth nodes, high-order (M−1) third nodes with a larger number of the in-degrees from among the one or more third nodes.

* * * * *